Dec. 3, 1968  R. E. NORVELLE  3,414,102
TAPE HANDLING MEANS FOR TAPE EMBOSSING TOOL
Filed Feb. 7, 1966  3 Sheets-Sheet 3
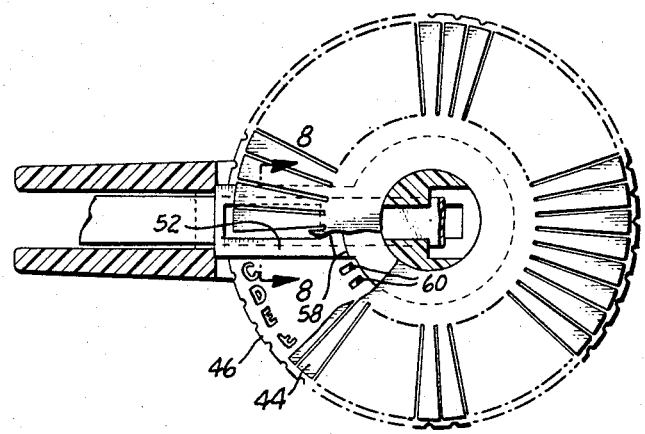
FIG. 7.
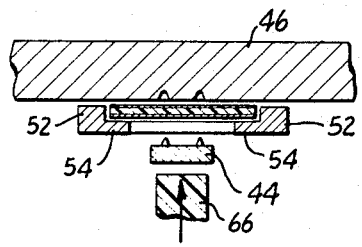
FIG. 8.
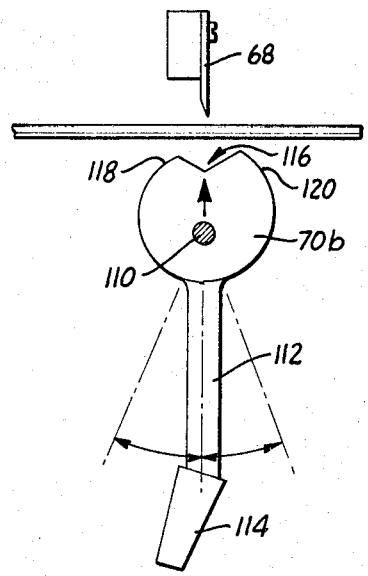
FIG. 9.
FIG. 10.
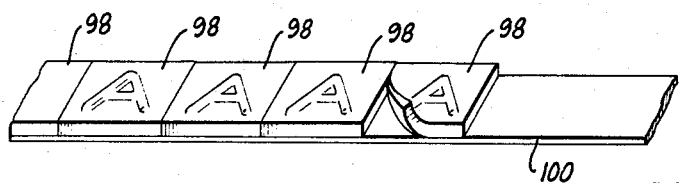
FIG. 11.
INVENTOR.
RALPH E. NORVELLE
BY
Naylor & Neal
ATTORNEYS United States Patent Office 3,414,102
Patented Dec. 3, 1968

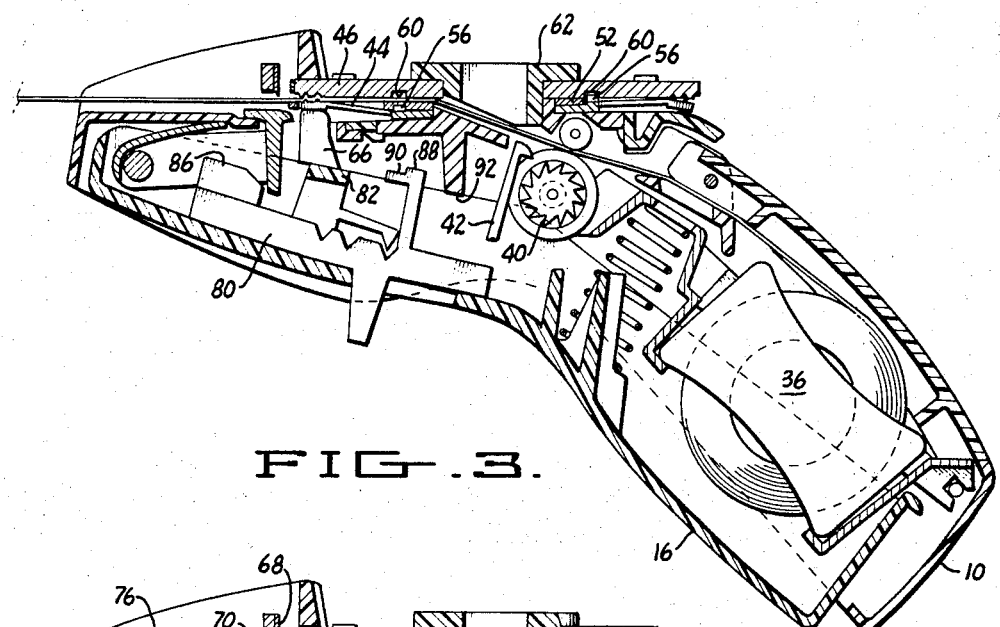
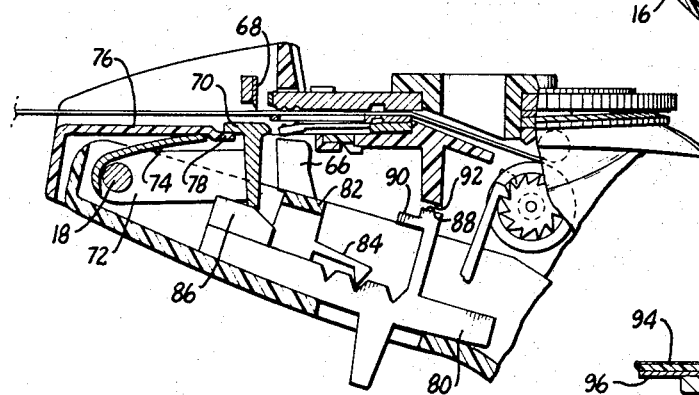
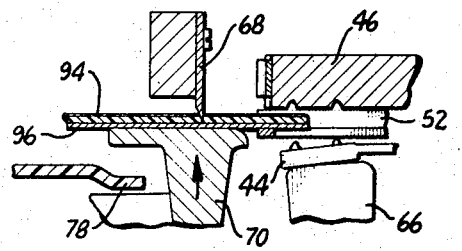
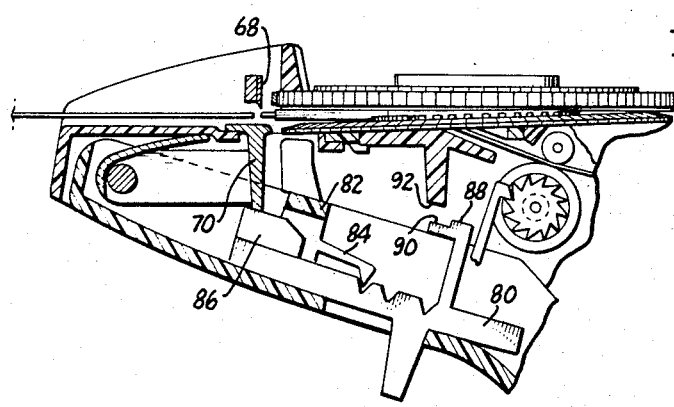

3,414,102
TAPE HANDLING MEANS FOR TAPE
EMBOSSING TOOL
Ralph E. Norvelle, 112 La Questa Drive,
Danville, Calif. 94526
Filed Feb. 7, 1966, Ser. No. 525,518
10 Claims. (Cl. 197—6.7)

This invention relates to a method and apparatus for making labels and more particularly to a new hand held embossing tool and a method of making labels with that tool.

Many advances have been made in recent years in the development of hand held embossing tools for embossing vinal tapes which change in color in the area of embossed letters. All of these tools employ a pair of discs carrying male and female embossing dies around their circumferences, and the discs are mounted for rotation about a central axis to move the dies sequentially past an embossing station in a tape path.

One type of well-known tool mounts the dies in such a position that the tape path passes through the dies tangentially, but this arrangement is awkward to use. Another type of tool mounts the dies in such a position that the tape paths passes through the dies along a diametrically extending path, thereby making the tool more easy to use, but the mounting mechanism for the discs is very complex and expensive because of the fact that the discs must be mounted for rotation about a central axis and at the same time must permit the tape path to extend through the central axis.

In accordance with this invention, there is provided a new hand held embossing tool in which the embossing dies are mounted with the tape extending along a diametrical path through the dies while at the same time all complex support linkage for the dies is eliminated.

In both of the types of embossing tools mentioned above, the tools are provided with two knives for cutting the plastic tape which is used with the tool. Thus, the embossable plastic tape generally consists of a layer of vinal plastic containing a coating of a pressure sensitive adhesive with a back-up layer of another plastic covering the adhesive and preventing adjacent turns of a roll of the tape from adhering to each other. The embossing tools mentioned above employ two cutting knives mounted adjacent to each other and operable upon a single stroke of the tool to both cut and score the composite tape described above, one of the knives cutting completely through the tape while the other knife scores the tape by cutting through the vinal plastic layer and the adhesive without cutting the backing strip. This combined cutting and scoring operation on the tape leaves a tab at one end of an embossed label by which the backing strip may be easily grasped and removed from the label. However, the use of two cutting knives adds materially to the cost of the embossing tool and requires that a label being embossed with the tool must be cut every time that it is scored.

In accordance with this invention there is provided a new embossing tool with which embossed labels may be both cut and scored, but the cutting and scoring operations may be performed separately by a single knife thereby reducing the cost of the cutting tool and also permitting the making of embossed labels by a new method.

The hand held embossing tools of the type described above are provided with a magazine from which a strip of embossable tape is fed, a tape feeding mechanism adjacent to the magazine for pulling tape out of the magazine and pushing it along its path, next a tape embossing area through which the tape passes and in which letters are embossed in the tape, and finally a tape scoring and cut off area where labels are scored and cut off after they have been embossed. Substantial problems are encountered in the known machines mentioned above where small pieces of tape become jammed between the tape driving mechanism and the tape cut off area. Thus, when the last label is cut off from a roll of tape, a small piece of tape is often left in the embossing tool between the cut off knife and the tape drive roller, and in the tools heretofore available on the market, it has been extremely difficult to remove these small pieces of tape from the tool often requiring that the tool must be completely taken apart and reassembled.

In accordance with this invention, a new embossing tool is provided in which the tape path is completely accessible throughout its length from tape magazine through the tape cutting station so that any small pieces of tape which may be accidentally lost in the tape path may be easily removed without interfering with the operation of the tool.

The embossing tools heretofore known to the art have also involved substantial problems in tape handling. The driving mechanism for advancing the tape along the tape path generally comprises a pair of rollers which pinch the tape between them with a driving mechanism for rotating one of the rollers. A good embossing tool must be carefully designed so that these two rollers pinch upon the tape with a predetermined force. If the force is too great, the rollers tend to form a groove in the tape when the tool is not in use and one local area of the tape remains between the pinch rollers for a substantial period of time. However, serious problems are encountered in driving the tape because the tape can be gripped with only a minimum force. These tape driving problems generally manifest themselves by irregular spacings between the letters which are embossed with the tool because the tape is moved along its path by the driving means through irregular distances each time the tool is actuated.

It has now been found that these tape driving problems result primarily from an interaction between the male die member and the tape in the embossing area. Thus, when the male and female die members are brought together to emboss the tape between them and then released to free the tape so that it may be advanced by the driving mechanism, the tape often follows the male die member keeping the die embedded in the letter which has just been embossed so that the tape and male die member remain locked together and prevent the driving mechanism from properly advancing the tape. In accordance with this invention a new embossing tool is provided which has a stripping mechanism for positively pulling the tape off of the male die after each embossing operation. It has been found that the incorporation of this stripper mechanism into an embossing tool substantially eliminates all of the driving problems which have been encountered heretofore. Additionally, the particular mechanism which is employed in the preferred embodiment of this invention serves as a portion of the unique support for the die wheels which permit the tape path to extend across the axis of the wheels while the wheels are mounted for rotation about their axes without any complex interconnection linkage.

In accordance with this invention, a new method of making embossed labels is provided. Thus, as indicated above, the embossing tools used heretofore employ a mechanism which simultaneously cuts and scores the vinal tape and backing strip. The embossing tool made in accordance with this invention may perform the scoring and cutting operations sequentially, and for this reason the tool is capable of making labels in accordance with a new method.

In accordance with this method, the embossing tool is operated one or more times to emboss a series of characters forming a label or a portion of a label, and then the tool is operated to score the vinal layer of a label without cutting the backing strip. Next, instead of operating the tool to cut the label off of the roll of tape held in the machine, the tool is operated again one or more times to emboss additional characters on the tape forming a second label or a second part of a label. The tool is again operated to score the vinal portion of the label without cutting the backing strip, and the tool may then be operated alternately for further embossing and scoring operations until the tool is finally operated to completely cut both the vinal portion of the tape and the backing layer. In this way, a series of labels or label portions are provided which are held together by their adhesive attachment to the backing strip, and the labels may be separately peeled from the backing strip. Several advantages are obtained by embossing labels in accordance with this method. In the first place, substantial quantities of embossable tape are saved since it is unnecessary to make a "zip tab" each time the vinal layer is scored. Secondly, it becomes possible to pre-form long lengths of label tape which may be carried to the site of application without carrying the tool and which may then be formed into a label at the ultimate site by assembling a plurality of label portions in juxtaposition with each other. For instance, a long strip of label portions may be formed where the strip contains a series of single letter labels with the series including one or more complete alphabets so that individual letters may be removed from the strip and applied to an article in juxtaposition to spell out any desired composite label.

Other features and advantages of the invention will become apparent from the following description read in conjunction with the attached drawing in which:

FIG. 3 is a sectional view similar to FIG. 2 illustrating the tool in closed position and in a condition for embossing letters on a strip of tape;

FIG. 4 is a sectional view of a portion of the apparatus illustrated in FIG. 3 with the apparatus adjusted to a condition for scoring the tape;

FIG. 5 is a sectional view on an enlarged scale illustrating a portion of the apparatus of FIG. 4 during the scoring stroke of the tool;

FIG. 6 is a view similar to FIG. 4 illustrating the condition of the tool for cutting completely through the vinal portion and backing strip of the tape;

FIG. 7 is a sectional view of the tool taken on the plane indicated at 7—7 in FIG. 2;

FIG. 8 is a sectional view taken along the plane indicated at 8—8 in FIG. 7;

FIG. 9 is a sectional view illustrating an alternative form of this invention for cutting and scoring the tape;

FIG. 10 is a sectional view illustrating another alternative form of apparatus of this invention for cutting and scoring the tape; and FIG. 11 is a perspective view of a portion of a label formed in accordance with this invention.

Figure 1:
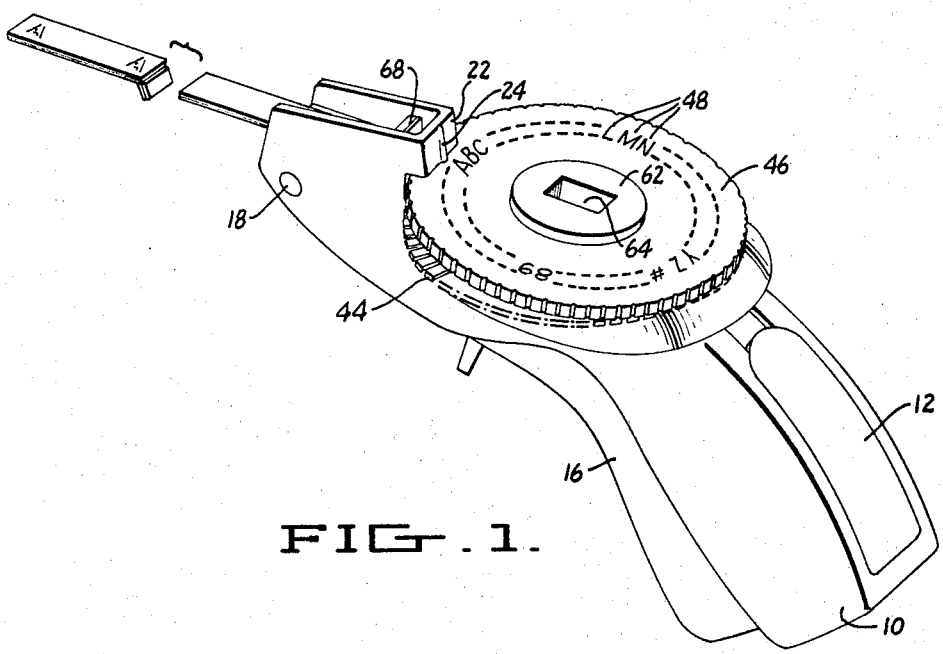
FIG. 1 is a perspective view of a preferred form of hand held embossing tool constructed in accordance with the principles of this invention.

Referring now in detail to the drawings and particularly to FIG. 1, the hand held embossing tool comprises a main frame 10 having a door 12 pivotally mounted thereon by means of a pivot pin 14. A trigger 16 is pivotally mounted on the body 10 by means of a pivot pin 18, and the rearward end of the trigger 16 is provided with a hook 20 engaging the body 10 for limiting the outward movement of the trigger.

An arch 22 is integrally formed on the upper part of the body 10 and provides a rigid support against which embossing, scoring, and cutting operations may be performed. An index mark 24 is provided on the arch 22 for alignment with printed indicia on the embossing dies indicating the particular character which is being embossed.

Figure 2:
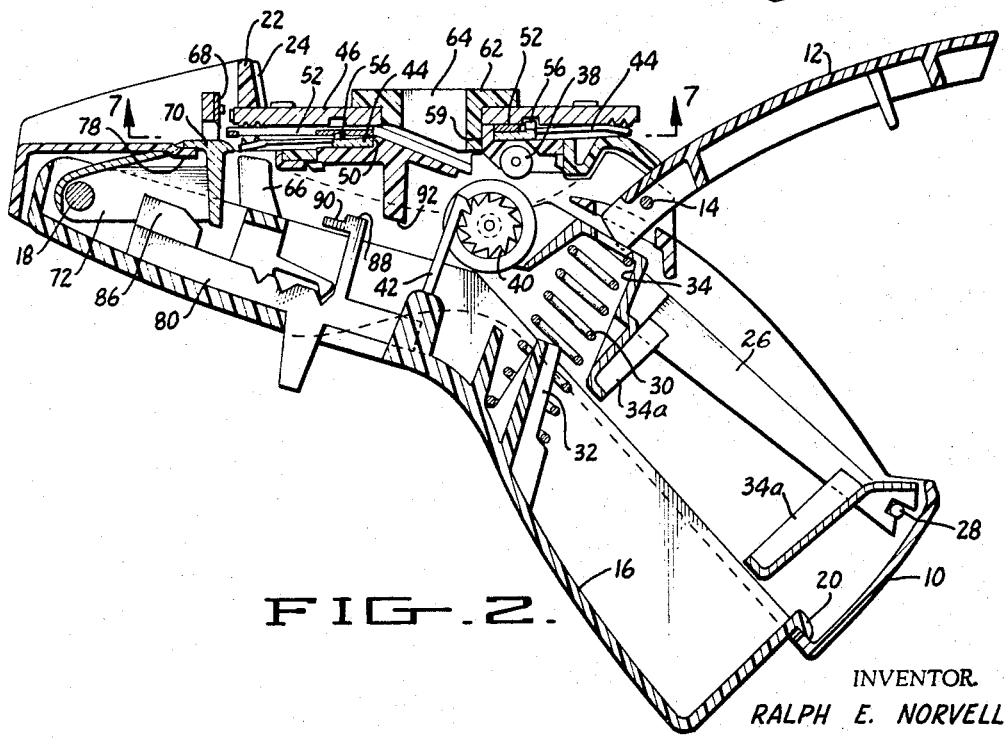
FIG. 2 is a vertical sectional view through the tool of FIG. 1 illustrating the tool in a condition with its magazine open and no embossable tape mounted in the tube.

An interior body member 26 is mounted inside the body 10 for pivotal movement about pin 28, and a helical compression spring 30 is mounted between a boss 32 on the trigger 16 and a seat 34 in the body 26 resiliently urging the trigger 16 downwardly and the body 26 upwardly as illustrated in FIG. 2. A pair of body portions 34a are provided on the body 26 for supporting a tape magazine 36 as illustrated in FIG. 3.

The tape driving mechanism comprises an idler roller 38 mounted in the body 10 and a drive roller 40 mounted on the forward end of the interior body 26. The drive roller 40 is provided with a peripheral rubber sleeve for frictionally driving the tape and is also provided with ratchet teeth which cooperate with a pawl 42. The pawl is prvided with a flexible stem and is mounted on the trigger 16 in conventional manner so that each time the trigger 16 is pulled into the body 10, the pawl 42 advances to pick up an additional tooth of the ratchet wheel as illustrated in FIG. 3 and advance the ratchet wheel by a part of one revolution when the trigger 16 is released. An additional ratchet tooth, not shown, extends from the body 26 to the ratchet wheel 40 on the back side of the ratchet wheel 40 as it is viewed in FIG. 2 to resiliently engage the ratchet teeth and prevent rotation of the ratchet wheel when he pawl moves from the position of FIG. 2 to the position of FIG. 3.

As illustrated in FIG. 2, the forward edge of the magazine door 12 is positioned to engage the top of the boss 34 on the interior body 26 so that when the door 12 is opened, it rotates the interior body 26 around pivot pin 28 and toward the trigger 16 so that the drive wheel 40 is moved out of engagement with the idler 38 permitting free movement of the tape along its path while the door 12 is open.

Male and female die wheels 44 and 46 are mounted on top of the body 10 as indicated in greater detail hereinafter, and the female die wheel 46 carries a plurality of embossed characters 48 which by alignment with the index 24 indicate the letter which is being embossed by the tool.

As illustrated in FIGS. 2 and 3, the body 10 is provided with a central hub 50 on which the male die 44 is rotatably mounted. A wedge member 52 (FIG. 7) is mounted on top of the male die 44 between the arch 22 and the central hub 50 with the wedge 52 provided with a pair of bottom flanges 54 which support the outer edges of the tape.

As is conventional in tools of this type, the female die wheel is rigid and provided with indented indicia, and the male die wheel 44 is formed with a central hub and a plurality of radially extending fingers with a raised character on the end of the finger cooperating with the indicia on the female die for embossing a particular letter. As best seen in FIG. 8, the wedge member 52 is provided with a slot between the flanges 54 where the finger on the male die wheel 44 enters the slot and engages the tape during an embossing operation, but at the conclusion of the embossing stroke, the male die portion 44 moves downwardly through the slot while the flanges 54 on the wedge 52 strip the tape off of the male die.

As illustrated in FIGS. 2 and 7, the male die is provided with a circumferentially extending series of axially extending projections 56 for locking the male and female die wheels together as explained hereinafter, and the underside of the wedge member 52 is provided with an arcuate slot 58 through which the projections 56 may pass as the male die wheel is rotated about its axis.

The female die wheel 46 is mounted on top of the male die and on top of the wedge member 52 for rotation with the male die while the wedge member 52 remains between the two die wheels. The female die wheel is provided with a circumferentially extending series of axially extending pockets 60 (FIG. 3) into which the projections 56 on the male die wheel extend. As illustrated in FIGS. 2 and 3, the male and female die wheels are slightly inclined with respect to each other by reason of the fact that the wedge member 52 is positioned between them on the left hand side of the axle 50 but not on the right hand side of the axle 50. By reason of this inclination, the projections 56 and pockets 60 interengage with each other on the right hand side of the axle 50 but not on the left hand side so that they provided rotational driving engagement between the two die wheels at the right hand side of the die wheels while permitting the tape path to enter the space at the center of the die wheels and pass between the die wheels along a diametric path at the left of the central hub 50.

A cap member 62 extends through the center of the female die member and into the central hub 50 to hold the two die wheels together, and a central opening 64 is provided in the cap 62 providing central access to the tape path between the embossing station and the drive rollers 38 and 40 so that an instrument may be inserted through the opening to remove any small pieces of tape which may become lodged in the tape path.

EMBOSSING

As illustrated in FIGS. 2 and 3, the interior of the trigger member 16 is provided with an embossing anvil 66 which is moved upwardly when the trigger 16 is squeezed into the body 10 so that the anvil 66 engages one of the finger portions of the male die wheel 44 forcing that finger portion upwardly through the slot in the wedge member 52 so that a tape in the tape path is embossed between the female die wheel 46 and one of the fingers of the male die wheel 44. The male and female die wheels 44 and 46 may be rotated in synchronization to align any particular portion of the male die wheel with the embossing anvil 66 for embossing any particular character and after each embossing stroke of the trigger 16, the pawl 42 rotates the ratchet wheel 40 by one increment to advance the tape for the next embossing stroke.

SCORING

As illustrated in FIGS. 2, 4 and 6, a cutting blade 68 is mounted on the bridge portion 24 adjacent to the periphery of the die wheels. An embossing and cutting anvil 70 is integrally formed with a pair of arms 72 which are pivotally mounted on the pivot pin 18, and a flexible web 74 is integrally formed with the arms 72 bearing against the underside of a front portion 76 of the body 10 resiliently urging the anvil 70 toward the position illustrated in FIG. 4. The upper portion 76 of the body 10 is provided with a lip 78 which extends under the forward edge of the anvil 70 limiting downward movement of the anvil 70.

Cutting and scoring of the tape in the embossing tool is accomplished by forcing the anvil 70 upwardly toward the cutting knife 68, and a shifter block 80 is mounted in the trigger 16 for controlling this motion of the anvil 70.

Thus, as illustrated in FIGS. 2, 3, 4 and 6, a slider block 80 is slidably mounted in the trigger 16 for longitudinal movement between three succsessive positions for embossing, scoring and cutting with the tool. A bridge portion 82 is mounted inside the trigger 16 and provided with a resilient detent finger 84 for resiliently holding the slider block 80 in any one of its three positions, the slider block having three notches as illustrated cooperable with the detent 84.

The slider block has a forward shoulder 86 for engaging the anvil 70 and a pair of rearward shoulders 88 and 90 positioned to engage a boss 92 on the body member 10 to limit the operating stroke of the trigger. Thus, when the slider block 80 is in the positioned illustrated in FIG. 3 for embossing with the tool, the forward shoulder 86 is positioned out of alignment with the anvil 70, and the rearward shoulders 88 and 90 are positioned out of alignment with the shoulder 92 so that the slider block 80 performs essentially no function during the embossing operation. However, when the slider block is moved one stage to the position illustrated in FIG. 4, the forward shoulder 86 is moved underneath the bottom of the anvil 70, and the upper shoulder 88 is moved into alignment with the shoulder 92 on the body 10. With the slider block 80 in the position illustrated in FIG. 4, the trigger 16 may be squeezed into the body 10, but engagement of the shoulders 88 and 92 will limit the operating stroke of the trigger, and the shoulders 88 and 92 are so positioned that the operating stroke of the trigger will be just sufficient to permit the forward shoulder 86 to lift the anvil 70 to the position illustrated in FIG. 5 where the anvil 70 approaches the cutting knife 68 by just a sufficient distance to cause the knife 68 to cut through the vinal layer 94 of the tape without cutting the backing strip 96 of the tape. Additionally, it should be noted that the action of the shoulders 88 and 92 in limiting the stroke of the trigger 16 prevents the embossing anvil 66 from moving the male die member 44 through a sufficient distance to cause an embossing operation.

CUTTING

When the slider block 80 is moved through another step to the position illustrated in FIG. 6, the forward shoulder 86 is again positioned in engagement with the underside of the anvil 70, and the rearward shoulder 90 is positioned in alignment with the shoulder 92 thereby causing the anvil 70 to move as the trigger 16 is squeezed while the aligned shoulders 90 and 92 permit sufficient travel of the trigger 16 that the anvil 70 and knife 68 completely cut through the vinal and backing layers of the tape without permitting sufficient travel of the trigger to cause an embossing operation.

Thus, the tool illustrated in FIGS. 1–8 may be selectively operated to either emboss, score or cut the tape depending upon the setting of the slider block 80, and the tool may thus be operated in accordance with the method of this invention to produce a series of embossed label segments 98 attached to a single backing strip 100 as illustrated in FIG. 11 where, for instance, the embossing wheels are set to emboss the letter *a* and then the trigger is operated a plurality of times with the slider block 80 alternately set in the positions of FIGS. 3 and 4.

As indicated above, the tool illustrated in FIGS. 1–8 contains only one cutting knife and means cooperable with the cutting knife for cutting or scoring the tape with the knife or rendering the knife inactive during embossing operations. Alternative means for employing such a single knife are illustrated in FIGS. 9 and 10.

In FIG. 9, the embossing tool is provided with an anvil 70A which may be mounted for active operation during every operating stroke of the trigger of the tool. A single cutting knife 68A is mounted above the anvil on a support body 102 which is pivotally mounted on a pin 104 carried by the bridge portion 22 of the tool. The anvil 70A is provided with two step portions 106 and 108 for use respectively in scoring and cutting the tape, and the body 102 may be rotated between three positions for embossing, scoring and cutting the tape. Thus, the body 102 may be rotated to a position with the knife 68A extending horizontally during embossing operations; the body 102 is rotated to the full line position of FIG. 9 for scoring operations, and the body 102 is rotated to the phantom line position of FIG. 9 for cutting operations. When the shifting mechanism of FIG. 9 is employed, means may be provided for limiting the operating stroke of the trigger during the embossing operation, but alternatively the portion 106 of the anvil 70A may be provided with a contoured surface for scoring as known to those in the art.

The apparatus illustrated in FIG. 10 for shifting between embossing, scoring and cutting conditions of the tool comprises an anvil body 70B mounted on a pivot pin 110 on the trigger 16 directly underneath the single knife 68. The anvil 70B has a downwardly extending finger 112 and operating knob 114 which extends below the lower level of the trigger 16 for manual manipulation when the anvil body 70B is to be rotated. The anvil body 70B has a notch 116 in its upper surface aligned with the knife 68 during embossing operations for preventing the knife 68 from cutting the tape, and the anvil body 70B has two anvil surfaces 118 and 120 on opposite sides of the notch 116 for scoring and cutting with the knife 68 respectively with the anvil surface 118 positioned closer to the axis of pivot pin 110 than is the anvil surface 120. Obviously, the anvil surface 118 may be contoured as indicated above.

While a preferred embodiment of this invention and several variations thereof have been illustrated and described in detail herein, it is obvious that many modifications thereof may be made without departing from the spirit and scope of the invention.

What is claimed is:

1. In a hand held embossing tool having a first body, a second body pivotally mounted on said first body for pivotal movement through an operating stroke toward and away from said first body, tape transport means on said first body operatively connected to said second body for advancing a tape an incremental distance along a tape path responsive to movement of said second body away from said first body, and embossing means on said first body for embossing indicia in a tape in said path responsive to movement of said second body through said operating stroke toward said first body, the improved means for scoring and cutting a tape in said path which comprises: knife means mounted on one side of said path for scoring and cutting a tape in said path, anvil means mounted on the opposite side of said path from said knife means, selectively operable connecting means for moving said knife means and anvil means into engagement with each other over a predetermined portion of the width of said tape path responsive to movement of said second body toward said first body, and selectively operable shifting means for moving said knife means and said anvil means toward each other for engaging a tape in said tape path while preventing said knife means from engaging said anvil means over said predetermined portion of the width of said tape path, with said connecting means and said shifting means operable alternatively for cutting and scoring a tape in said path.

2. The improved embossing tool of claim 1 in which said shifting means comprises a stop element mounted between said first and second bodies for movement between cut and score positions with said stop element and said bodies having stop portions thereof positioned in alignment with each other in said score position and not in said cut position of said stop element for preventing movement of said second body through said full operating stroke when said stop element is in said score position.

3. The improved embossing tool of claim 2 in which said stop element is also movable to an emboss position, and said connecting means comprises a support portion on said stop element positioned to engage said anvil in said cut and score positions of said stop element and positioned out of engagement with said anvil in said emboss position of said stop element.

4. The improved embossing tool of claim 1 in which said knife means comprises a knife having a single cutting edge mounted on said first body; said anvil means comprises a single anvil movably mounted on said first body; a stop element is mounted on said second body selectively movable between emboss, score and cut positions; said connecting means comprises a support portion on said stop element positioned to engage said anvil in and only in said score and cut positions of said stop element, and said shifting means comprises first and second adjacent stops on said stop element engageable with said first body in said score and cut positions respectively of said stop element with said second stop positioned to limit said operating stroke of said second body to prevent operation of said embossing means, and with said first stop positioned to further limit said operating stroke of said second body to prevent said anvil from engaging said knife.

5. The improved embossing tool of claim 1 in which said anvil means has first and second portions adapted for cooperation with said knife means for respectively cutting and scoring tape in said path, and said shifting means comprises means for moving said anvil with respect to said knife means to align said first and second anvil portions with said knife means alternately.

6. A hand held embossing tool comprising a frame, a first disc mounted on said frame for rotation about a central axis, a second disc mounted on said frame for rotation generally coaxially with said first disc and in a plane inclined slightly to said first disc whereby said discs are closer together in a first area on one side of said axis than in a second area on the opposite side of said axis from said first area and said discs define a space between them extending at least partially around said axis, transport means for moving a tape along an elongated path through said space entering said space between said first and second areas and leaving said space adjacent to said second area, a series of notches extending around said axis on one of said discs, a series of teeth extending around said axis on the other of said discs in mesh with said notches in said first area and out of mesh with said notches in said second area, a series of male dies positioned around one of said discs facing toward the other of said discs, a corresponding series of female dies positioned around the other of said discs facing toward and engageable with said male die members, and embossing means movable with respect to said body for forcing said male and female die members together in said second area.

7. The embossing tool of claim 6 characterized further by the inclusion of a wedge mounted on said frame and extending into said space in said second area between said tape path and said male dies with said wedge having a slot therein communicating with said tape path for permitting movement of said male dies therethrough responsive to operation of said embossing means and for stripping tape off of said male dies.

8. The embossing tool of claim 6 characterized further by the inclusion of rotary support means for said discs including a hollow hub on said body rotatably supporting the interior of said first disc and a cap member mounted in said hub and rotatably engaging the interior of said second disc with said transport means including guide means extending through said hub and defining the portion of said path where said path enters said hub, and an access opening in said cap communicating with said path.

9. The embossing tool of claim 6 characterized further by the inclusion of knife means mounted on one side of said path adjacent to said second area, anvil means mounted on the opposite side of said path from said knife means, selectively operable connecting means for moving said knife means and said anvil means together responsive to movement of said embossing means with respect to said body, and selectively operable shifting means for preventing the entire length of said knife means from engaging said anvil.

10. In an embossing tool having an embossing station, support and transport means for moving tape along a path past said station, a set of female dies mounted on one side of said path movable with respect to said path to alternately position individual dies of said set at embossing stations, a set of male dies mounted on the other side of said path movable with respect to said path to alternatively position individual male dies of said set at said embossing station, and actuating means for moving the male die at said embossing station toward the female die at said embossing station, the improvement comprising a stripper plate mounted at said embossing station between said path and said set of male dies with said stripper plate having a slot therein positioned to permit the male die at said embossing station to pass through said plate into engagement with a tape in said path responsive to operation of said actuation means with said slot having a width less than the width of said tape path whereby a tape in said path is continuously supported along its edges at said embossing station for stripping from said male die.

References Cited

UNITED STATES PATENTS

| | | | |
|---|---|---|---|
| 2,979,179 | 4/1961 | Anglim et al. | 197—6.7 |
| 3,083,807 | 4/1963 | Travaglio | 197—6.7 |
| 3,091,318 | 5/1963 | Carboni | 197—6.7 |
| 3,133,495 | 5/1964 | De Man | 197—6.7 XR |
| 3,155,215 | 11/1964 | Avery | 197—6.7 |
| 3,237,494 | 3/1966 | Norvelle | 197—6.7 XR |
| 3,239,048 | 3/1966 | Bogeaus | 197—6.7 |
| 3,263,791 | 8/1966 | Pedersen et al. | 197—6.7 |

ROBERT E. PULFREY, *Primary Examiner.*

E. S. BURR, *Assistant Examiner.*